United States Patent [19]

Gabet

[11] Patent Number: 5,102,534

[45] Date of Patent: Apr. 7, 1992

[54] AUTOMATIC FILTER CLEANING DEVICE BY ULTRASOUND GENERATOR MODULATED THRU DEVICE SIDE WALL

[76] Inventor: Andre Gabet, 20, rue Trou Samson, 95150 Taverny, France

[21] Appl. No.: 548,545

[22] Filed: Jul. 5, 1990

[30] Foreign Application Priority Data

Jul. 7, 1989 [FR] France .................. 8909161

[51] Int. Cl.⁵ .................. B01D 36/04; B01D 35/143
[52] U.S. Cl. .................. 210/90; 210/106; 210/134; 210/143; 210/254; 210/259; 210/407; 210/483
[58] Field of Search .................. 210/90, 106, 130, 134, 210/143, 254, 261, 262, 304, 311, 312, 313, 388, 354, 407, 513, 523, 785, 483, 108, 748, 86, 138, 141, 259, 260, 298, 303, 305, 433.1; 134/1; 73/632

[56] References Cited

U.S. PATENT DOCUMENTS

| | | | |
|---|---|---|---|
| 2,688,402 | 9/1954 | Butterworth | 210/523 |
| 3,630,377 | 12/1971 | Brooks | 210/262 |
| 3,713,540 | 1/1973 | Davidson et al. | 210/748 |
| 3,777,888 | 12/1973 | Zellback et al. | 210/130 |
| 3,839,185 | 10/1974 | Vicard | 204/307 |
| 3,870,640 | 3/1975 | Reece | 210/388 |
| 4,112,768 | 9/1978 | Holland et al. | 210/106 |
| 4,248,710 | 2/1981 | Rampignon | 210/313 |
| 4,279,751 | 7/1981 | Fishgal | 210/785 |

FOREIGN PATENT DOCUMENTS

| | | | |
|---|---|---|---|
| 332890 | 10/1976 | Austria | 210/143 |
| 0176867 | 4/1986 | European Pat. Off. | 210/486 |
| 858539 | 10/1952 | Fed. Rep. of Germany | 210/388 |
| 2225057 | 7/1973 | Fed. Rep. of Germany | 210/304 |
| 2449817 | 4/1975 | Fed. Rep. of Germany | 210/388 |
| 8805945 | 7/1980 | Fed. Rep. of Germany | 210/143 |
| 3117712 | 11/1982 | Fed. Rep. of Germany | 210/332.2 |
| 3613041 | 10/1987 | Fed. Rep. of Germany | 210/346 |
| 5451981 | 4/1979 | Japan | 210/785 |
| 1030603 | 2/1989 | Japan | 210/106 |
| 350495 | 9/1972 | U.S.S.R. | 210/388 |
| 1101262 | 7/1984 | U.S.S.R. | 210/513 |
| 1488025 | 10/1977 | United Kingdom | 210/346 |

OTHER PUBLICATIONS

International PCT Publication WO79/00884, "Regeneration Process of a Filtering Apparatus and Device for Implementing Such Process", 1 Nov. 1989, Potiron et al.

Primary Examiner—Robert A. Dawson
Assistant Examiner—Joseph Drodge
Attorney, Agent, or Firm—Sandler, Greenblum, & Bernstein

[57] ABSTRACT

Automatic filter cleaning device for liquid circuits, including at least one filter in the passage of the liquid. The device includes a filter situated above a decanting tank for impurities so that its upstream wall is turned towards the tank, while an ultrasound generator is provided to generate ultrasounds in the decanting tank and is connected by a modulator to a projection of a sidewall of the tank. Advantageously, a liquid circuit branch conduit with a branch circuit control valve is provided in order to short-circuit, at least in part, the filtration assembly comprised of the filter and the tank.

11 Claims, 1 Drawing Sheet

AUTOMATIC FILTER CLEANING DEVICE BY ULTRASOUND GENERATOR MODULATED THRU DEVICE SIDE WALL

1. Field of the Invention

The invention concerns a liquid circuit filter device including at least one filter in the passage for the liquid.

2. Description of pertinent materials and Background

Known liquid filtering occurs by means of a filter, generally in the form of a basket through which the liquid is forced to circulate.

To clean such a filtering system, it is necessary to remove the filter, and to clean the filter at a properly equipped work station. Such an operation obliges the user to disassemble the system, and can also require the closing of the circuit during this operation.

In view of the above, systems with scrapers or similar devices to remove impurities from a filter have been envisioned. However, these mechanical systems also have drawbacks and limitations.

Further, it is known that various objects, including certain mechanical pieces, can be cleaned by submerging them in an ultrasound bath, and subsequently removing these pieces from the bath.

SUMMARY OF THE INVENTION

It is an object of the present invention to provide at least one filter device, which is completely original in the methods used to assure an automatic cleaning of the filter.

The device according to the invention is distinguished in that the filter is placed above a decanting tank for impurities so that its upstream wall is turned towards said tank, while an ultrasound generator is provided to generate ultrasounds in the decanting tank.

Preferably, according to the applications, a liquid circuit branch conduit with a branch conduit control valve is provided to short circuit at least part of the filtration assembly which includes the filter and the tank.

Advantageously, this device has an element to measure the rate of build-up on the filter. This measuring method is, for example, constituted of a differential pressure gauge installed in a way to measure different pressures between the upper and lower streams in relation to the filter.

Contrary to conventional devices with a filter in the form of a basket, the filter here is advantageously in the form of a bell whose opening is turned towards the decanting tank, that is, reversed in relation to the known art.

Preferably, the decanting tank is connected to an evacuation circuit by means of an evacuation valve. According to one construction method, a supplementary valve is provided in the liquid circuit upstream from the filtration assembly.

So that the ultrasound generator works well, the tank has a cylindrical part on which is a projecting volume generally in parallelepiped shape, while the ultrasound generator is provided with a modulator which is applied to the large flat side of the projecting volume.

A device provided with an element to measure the build-up rate and an evacuation valve for impurities can advantageously include a central control connected to the build-up rate measurement element and to the branch conduit control and evacuation valves respectively, in a manner to assure an automatic cleaning cycle of the filter.

Preferably in this case, the central control is programmed in order to assure a filter cleaning cycle by activating the various mechanisms in the following manner: opening the branch conduit control valve, putting the ultrasound generator into operation, stopping said generator, opening the evacuation valve, then simultaneously or successively closing the branch conduit control and evacuation valves.

Triggering the start of the filter cleaning cycle is, for example, assured by the build-up rate measuring device and/or according to a program which is a function of the filter circuit.

In effect, the device according to the invention can be used in a cooling, heating, or other circuit, such that the program to trigger the cleaning cycle will depend on the application, e.g., periodic triggering according to the consumption of liquid.

BRIEF DESCRIPTION OF THE DRAWINGS

The invention will be well understood and other particularities will appear when the following description is read, referring to the attached drawings in which:

FIG. 1 illustrates a conduit 1 which represents the circuit of the liquid to be filtered.

Figure 1:
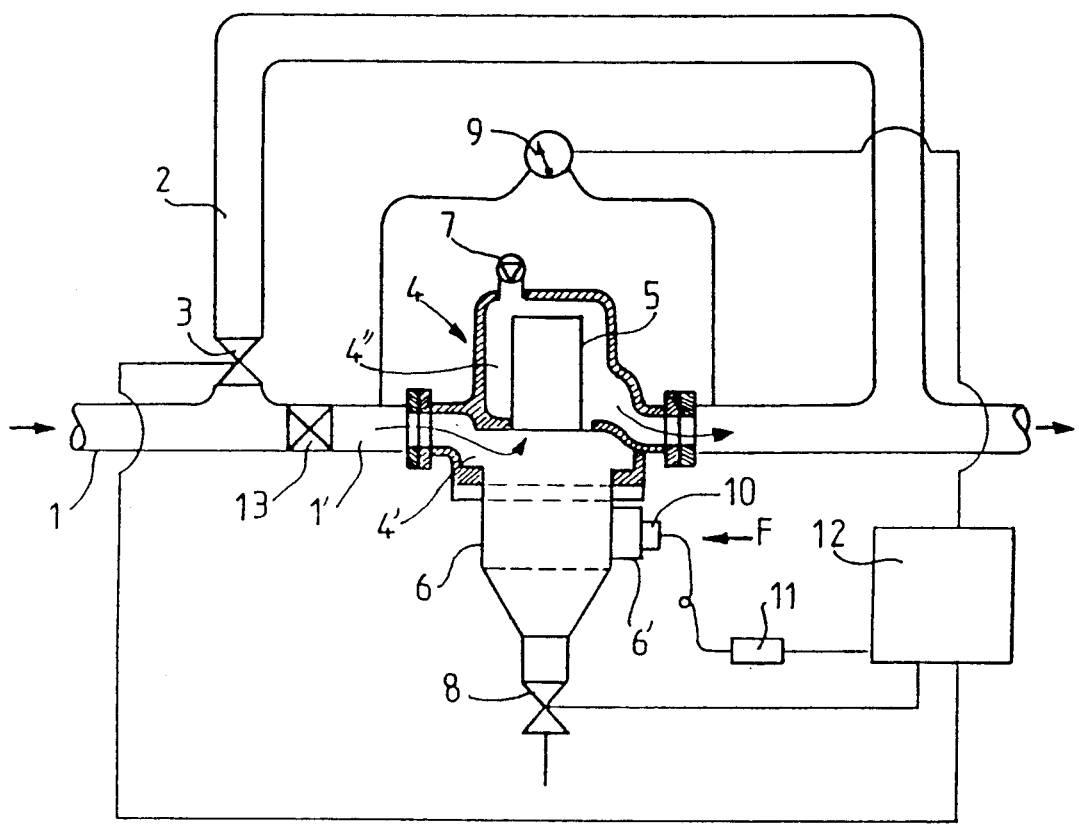
FIG. 1 shows a section (except for the decanting tank, seen in elevation) of a device according to the invention.

On conduit 1 is mounted a branch conduit 2 at the entry of which is provided a branch conduit control valve 3.

On part 1' of the conduit 1, which can also be short circuited, is installed a filtration assembly including a body 4 circulation route for the liquid, and with an entry chamber 4' and upper chamber 4" in which is contained a filter 5.

As seen in FIG. 1, the filter is in the shape of a bell or an inversed basket placed with its upper part above the chamber 4', itself situated about a decanting tank 6 attached to the body 4.

As indicated by the arrows in the design, the liquid is forced to pass through the inside of filter 5, such that the upstream wall of the filter is turned towards the tank 6.

In the chamber 4" of body 4, which is thus a downstream chamber in relation to filter 5, is installed a degasser 7 intended to eliminate possible air pockets in the body 4.

In the lower part of the decanting tank 6 is provided an evacuation valve 8 connected, for example, to an evacuation conduit (not represented) intended to drain the impurities and dirt to the sewer.

It is interesting to note in passing that during normal operation, that is, outside of the cleaning periods which will be described in more detail below, the tank 6 serves as a recovery element for large and/or heavy impurities which might be found in the network.

A differential pressure gauge 9 is arranged, as seen in FIG. 1, in a way to measure the differential pressures between the upstream and downstream of the filtration assembly (4, 5, 6).

Figure 2:
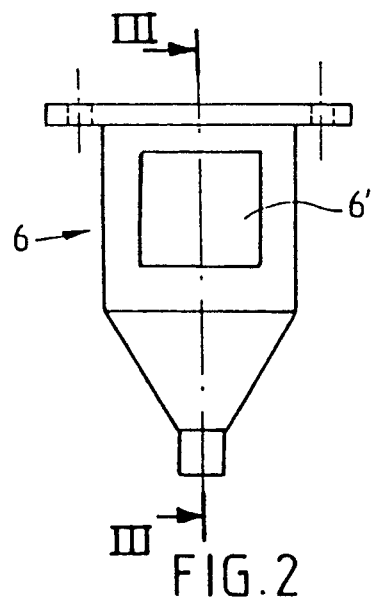
FIG. 2 is a view of the decanting tank indicated by arrow F of FIG. 1 with modulator 10 being omitted.
Figure 3:
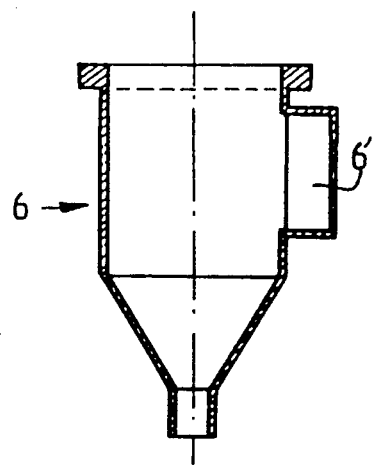
FIG. 3 is a section according to III—III of FIG. 2.

The decanting tank 6, shown in more detail in FIGS. 2 and 3, which in general is provided with a cylindricalconical shape, presents a small volume 6' in parallelepiped shape on the large side of which is applied a modulator 10 connected to an ultrasound generator 11. This volume 6' permits a better response to the particular stresses required by the modulator 10, and assures that it will operate better.

The valves 3 and 8 in the form of electric valves, for example, are electrically connected, as seen in FIG. 1, to a central control 12 to which is also connected the differential pressure gauge 9 and the ultrasound generator 11.

FIG. 1 also shows a valve 13 located at the entry of the part 1' of the conduit 1.

The central command 12 assures a cleaning cycle of the filter 5 by the following program, for example:

a) opening valve 3 to assure the detour of the liquid, b) putting the ultrasound generator into operation during a certain period, determined as a function of the level of buildup on filter 5 and the nature of the impurities, c) stopping the generator 11, the valve 3 remaining open in order to facilitate cleaning the filter by counterpressure.

d) opening the valve 8 to evacuate the impurities after decanting, e) then simultaneous or successive closure of valves 3 and 8 in order to restore the system to its original state.

The start of the cycle can be triggered by a manual action as a function, for example, of the measure taken by the pressure gauge 9 which indicates, by measuring the difference in pressures, the level of buildup on filter 5, or even automatically by a signal emanating from the pressure gauge.

However, it is clear that according to the applications, one may want to also trigger the cycle according to other criteria as already noted, and the central control 12 can be programmed in consequence.

The valve 13, which is discretionary, permits losses to be minimized, and valves 3 and 13 can also be replaced by a single valve with three channels.

In addition, if the branch conduit 2 avoids having to close the circuit during cleaning, it is possible, according to the application, to eliminate it. In addition to the specific example described above, this invention also includes all modification or variants which are obvious to a person skilled in the art, without departing from the scope of the present invention. For example, in general, it is not a drawback to deviate from the principle circuit during cleaning with certain applications of the continuous circuit (cooling circuit for example) often for which only part of the circulating liquid is filtered during each passage.

I claim:

1. Filtering device for a liquid circuit comprising:
    a decanting tank for containing impurities to be filtered from a liquid in a liquid circuit;
    at least one filter located above said decanting tank having an upstream wall turned towards said decanting tank for receiving liquid from said liquid circuit; and
    an ultrasound generator for generating ultrasounds in said decanting tank, said ultrasound generator being coupled to said decanting tank through a connection to a projecting volume of a side wall of said decanting tank below said at least one filter.

2. The device according to claim 1, wherein said liquid circuit includes a branch conduit having a branch conduit control valve arranged to short circuit, at least in part, said at least one filter and said decanting tank.

3. The device according to claim 2, further including an evacuation valve connecting said decanting tank to an evacuation circuit; means for measuring rate of buildup of impurities on said at least one filter; and a central control connected to said means for measuring the rate of buildup, said branch circuit control valve and said evacuation valve to ensure an automatic cleaning cycle.

4. The device according to claim 3, wherein said central control is programmed to ensure a filter cleaning cycle by means of opening said branch conduit control valve, placing said ultrasound generator into operation, stopping said ultrasound generator, opening said evacuation valve, and simultaneously or successively closing said branch conduit control valve and said evacuation valve.

5. The device according to claim 4, wherein said central control is programmed to start the filter cleaning cycle by at least one of said means for measuring the rate of buildup and a program which is a function of nature of impurities of a liquid to be treated.

6. The device according to claim 1, further including means for measuring the rate of buildup of impurities on said at least one filter.

7. The device according to claim 6, wherein said means for measuring the rate of buildup on said at least one filter comprises a differential pressure gauge arranged to measure a difference between upstream and downstream pressures in relation to said at least one filter.

8. The device according to claim 1, wherein said at least one filter is bell shaped with an opening turned towards said decanting tank.

9. The device according to claim 1, further including an evacuation valve for connecting said decanting tank to an evacuation circuit.

10. The device according to claim 1, further including a supplementary valve in said liquid circuit upstream of said at least one filter.

11. The device according to claim 1, wherein said connection comprises a modulator, said projecting volume being located on a circular part of said decanting tank, said projecting volume having a large, flat side; and said modulator being positioned on said large, flat side of said projecting volume.

* * * * *